United States Patent

Kaaden et al.

Patent Number: 5,875,061
Date of Patent: Feb. 23, 1999

[54] METHOD AND APPARATUS FOR THE RECORDING OF SIGNALS

[75] Inventors: Jürgen Kaaden; Klaus Oldermann, both of Villingen-Schwenningen, Germany

[73] Assignee: Deutsche Thomson-Brandt GmbH, Villingen-Schwenningen, Germany

[21] Appl. No.: 425,121

[22] Filed: Apr. 19, 1995

[30] Foreign Application Priority Data

| Apr. 22, 1994 | [DE] | Germany | 4414147.5 |
| Jul. 22, 1994 | [DE] | Germany | 4426033.4 |
| Sep. 20, 1994 | [DE] | Germany | 4433312.9 |

[51] Int. Cl.$^6$ ............ G11B 5/09; G11B 15/48; H04N 11/24; H04N 9/79
[52] U.S. Cl. ............ 360/48; 360/74.1; 360/74.4; 386/37; 386/40; 386/123; 386/124
[58] Field of Search ............ 360/64, 48, 74.1, 360/74.4; 386/6, 37, 40, 67, 68, 101, 123, 124

[56] References Cited

U.S. PATENT DOCUMENTS

| 4,665,443 | 5/1987 | Tanaka | 360/7 |
| 4,802,038 | 1/1989 | Oguro | 360/22 |
| 5,194,997 | 3/1993 | Kozuki et al. | 360/48 |
| 5,235,471 | 8/1993 | Fell et al. | 360/64 X |
| 5,349,479 | 9/1994 | Arimura et al. | 360/70 |
| 5,495,369 | 2/1996 | Rijckaert et al. | 360/64 X |
| 5,583,711 | 12/1996 | Ohkubo et al. | 360/74.1 |
| 5,606,467 | 2/1997 | Hirata | 360/74.1 |

FOREIGN PATENT DOCUMENTS

| 3604374 | 4/1991 | Germany . |
| 4229002 | 4/1993 | Germany . |

OTHER PUBLICATIONS

Search report from the German Patent Office.

*Primary Examiner*—Aristotelis M. Psitos
*Assistant Examiner*—Regina Y. Neal
*Attorney, Agent, or Firm*—Joseph S. Tripoli; Frederick A. Wein

[57] ABSTRACT

Method and apparatus for recording a digital signal wherein the recording rate is higher than the available data rate. In such a situation, the available excess recording capability is used for extending the playing time by the existing storage capacity of a magnetic tape is better utilized. In the present embodiment, playback time is increased by use of a constant tape transport speed with part-segmented helical track recording and a bidirectional recording operation during recording and replay.

4 Claims, 8 Drawing Sheets

METHOD AND APPARATUS FOR THE RECORDING OF SIGNALS

BACKGROUND

It is known that in DVC (Digital Video Cassette) digital video magnetic tape recording systems, a high data rate (25–50 Mb/s) and long the playing time are achievable. MPEG (Motion Picture Expert Group) has a very complex data reduction system with motion estimation, interpolation and bidirectional prediction. Great complexity arises in the encoder in which mathematical operations must be generated from the source material. To the decoder, inverse computing instructions are conveyed which reconstructs the image. This coding process is very effective but the great complexity of the encoder with little complexity in the decoder provides a system adapted to be mainly used in the area of transmission systems for digital image material, for example, digital television with data rates between 2 to 8 Mb/s for SDTV and 6 to 24 Mb/s for HDTV. In this arrangement, a complex encoder is needed in the studio for each program to be transmitted, and the incoming data stream is interpreted by simple decoders at the user.

Since it is also intended to record these signals digitally at the data-reduced level, digital magnetic tape recording devices according to the DVC system, are considered usable. In this arrangement, the MPEG data stream is recorded transparently, i.e., unchanged, and is outputted during playback so that the decoder does not see any difference between transmitted and recorded data.

Such a recording device is capable of a continuous recording data stream of, for example, 25 Mb/s, but only a continuous/variable data stream of, for example, 8 Mb/s (SDTV) is available. Accordingly, an adaptation of the recording data rate is necessary to use the full capability of the recorder and the available excess capacity of the recorder should not be lost but should be utilized for extending the playing time.

The present invention has an object of creating a recording method by means of which the existing storage capacity of a magnetic tape can be better utilized Accordingly, it is an object of the present invention to provide a recording method for DVC devices, which has an extension of playing time by providing a constant speed tape transport with part-segmented helical track recording and a bi-directional mode during recording and playback.

In known methods, there is a phase of tape rewinding between the segment writing processes, in which no recording takes place for approximately 4 minutes (depending on transport speed and tape length) unless this amount of data is accommodated in a memory. With an input data rate of 8 Mb/s and 4 minutes duration, the memory would have to have a size of 1920 Mbit. Such a memory is too expensive for consumer products.

In the method according to the present invention, this can be achieved by initially writing only a part-area of the helical track (for example ¼), a so-called segment. The remainder of the track (for example ¾) initially stays blank or is filled with data which is not relevant. When a number of passes follow one another, more and more areas of the track are recorded until, finally, the total track is completely recorded.

The helical track magnetic tape recording device according to aspects of the invention exhibits a bidirectional recording and replay mode, the tape transport speed being identical in both directions and in both operating modes. The principle of segmented recording is used. When the first segment has been recorded in the forward direction of transport and the end of the tape is reached, the direction of tape travel changes and the second segment is added with a changed track angle to segment 1 adjoining it. The offsets between the track segments occurring due to the difference in track angle are absorbed by having correspondingly large steps between segments. To buffer the response time of the drive during the change in direction at the ends of the tape, a memory is provided which accommodates the data for, for example, 2 seconds.

The total recording consists of individual segmented single recordings in a row which partially differ in their track angle. Between the recording of the individual segments, the direction of tape travel is switched over. During the switching processes, the data is temporarily stored. The length of the segments depends on the ratio between input data rate and recording data rate.

Segments which have been written in the same direction of tape travel can be simultaneously read during one replay pass. The tracking information is only obtained from one ~ segment. During the recording, the memory filled after one switch-over process is emptied until the next process of switching tape direction occurs. During replay, the memory is always kept full in order to be able to provide data from the memory when the direction is changed. The maximum recording data rate is slightly higher on average than the input data rate. The replay data rate corresponds to the input data rate during the recording. The replay data rate is higher than the input data rate during the recording (during the simultaneous replaying of a number of segments). The data contents of an individual segment correspond to the audio or, respectively, video information of a program. At the end of the tape, the drive is switched to the inverse direction of tape transportation and the starting and turn-off time of the recording amplifier is adapted in such a manner that a track segment adjoining the previously written segment is written at a different track angle.

BRIEF DESCRIPTION OF THE DRAWINGS

Reference may be had to the drawings wherein.

DETAILED DESCRIPTION OF THE PREFERRED EMBODIMENT

Figure 1:
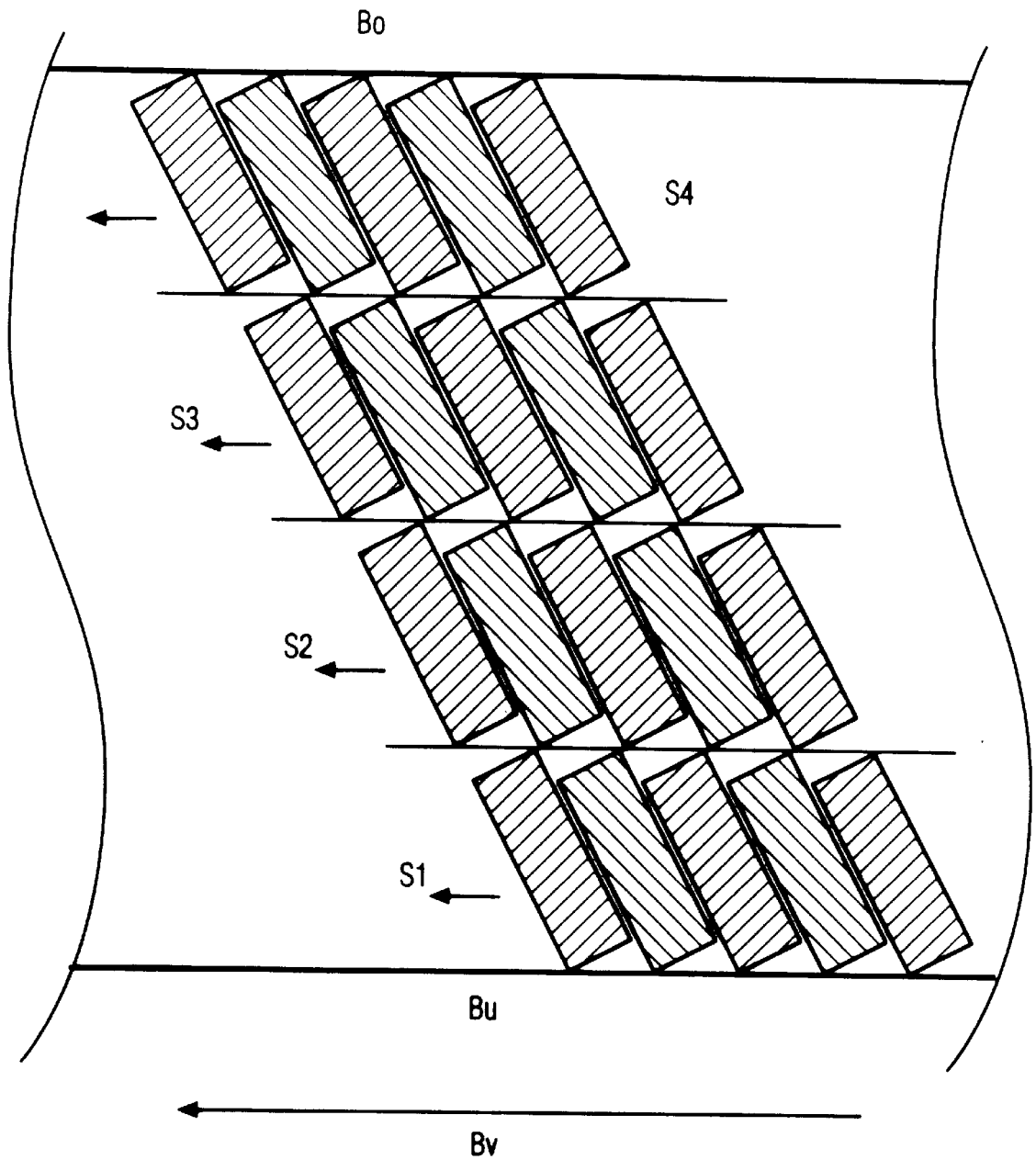
FIGS. 1, 2 show the segmented helical track recording of the magnetic tape.

FIG. 1 shows the segmented helical track recording for 4 segments S1–S4 from the bottom edge Bu to the top edge Bo of the tape. Different shadings identify the azimuth angles of the heads which normally write alternatingly (as shown) or simultaneously in special versions. Due to this angle offset, adjacent track information is effectively decoupled during reading. Recording only takes place in one direction of tape travel Bv. Rewinding is necessary between the recording of the individual segments.. Recording gaps ensure that the individual segments can be edited which are of significance, for example, in the case of copying. Such segment recordings are used in the 8 mm video system, in DAT and in the new digital, video format DVC.

Figure 2:
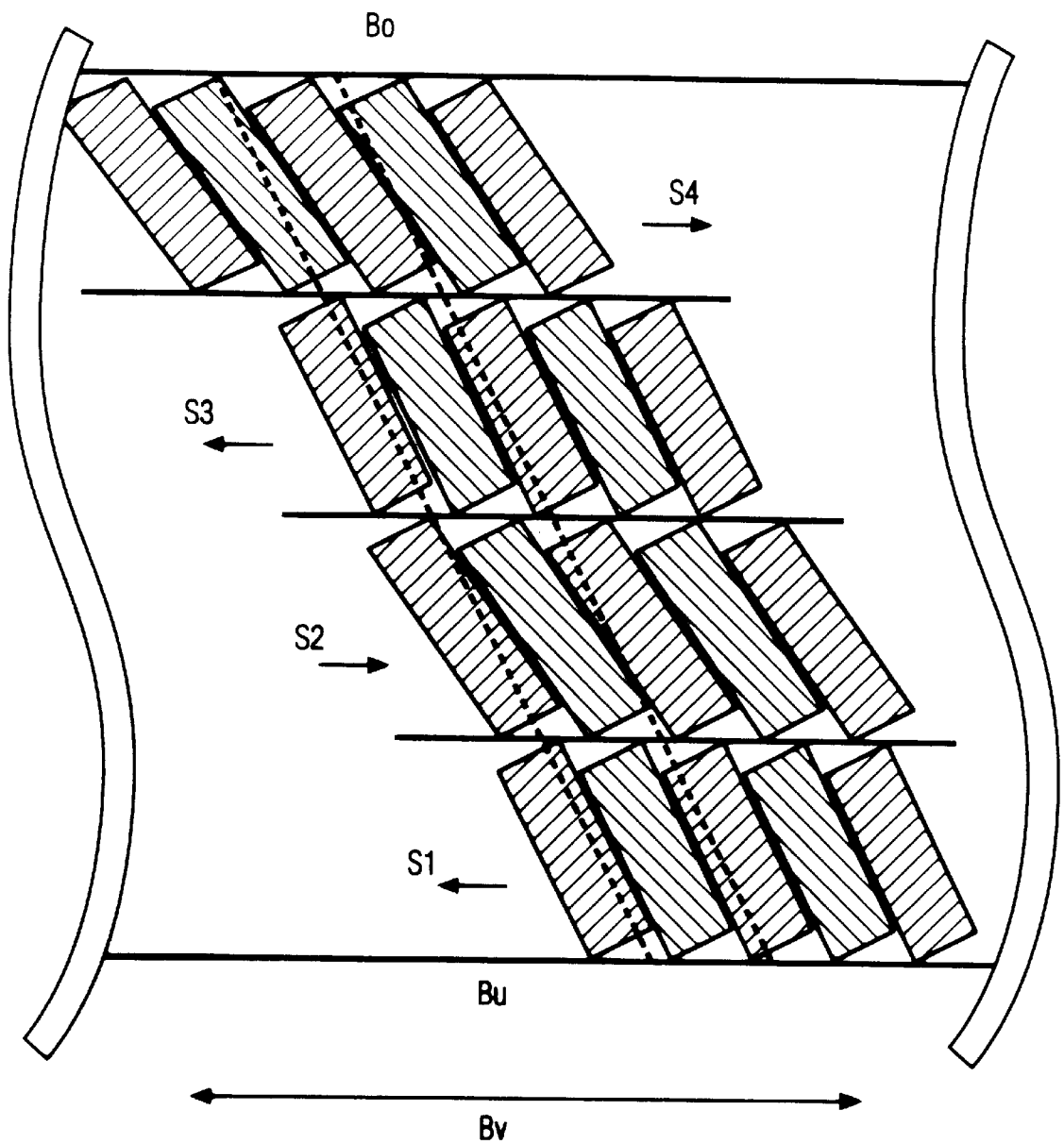

FIG. 2 shows the conversion of the position of the segments which occurs in bidirectional operation. Segments S1 and S3 have been recorded in one direction of tape travel Bv and segments S2 and S4 in the other direction of tape travel. In each case, it is possible to read one group (S1, S3 or, respectively, S2, S4) in one pass of the tape. Thus, the replay data rate could be twice as high as the recording data rate in the case shown. The change in the recording track angle, clearly seen from the figure, is due to the helical track recording. The readability of the information of different track angles and thus extended functions (for example the representation of all recorded programs) is greatly dependent on the length of the segments and head width. The representation of the dashed lines L clearly shows the reading limits at 10 μm recorded track width and 14 μm head track width. To be able to partially read the information of one direction when replaying in the other direction, a defined phase offset is maintained during the recording. One or more prerecorded segments are used as reference. For this purpose, first the previously written segments would be read and the new segment is correspondingly appended when a new segment is inserted.

Figure 3:
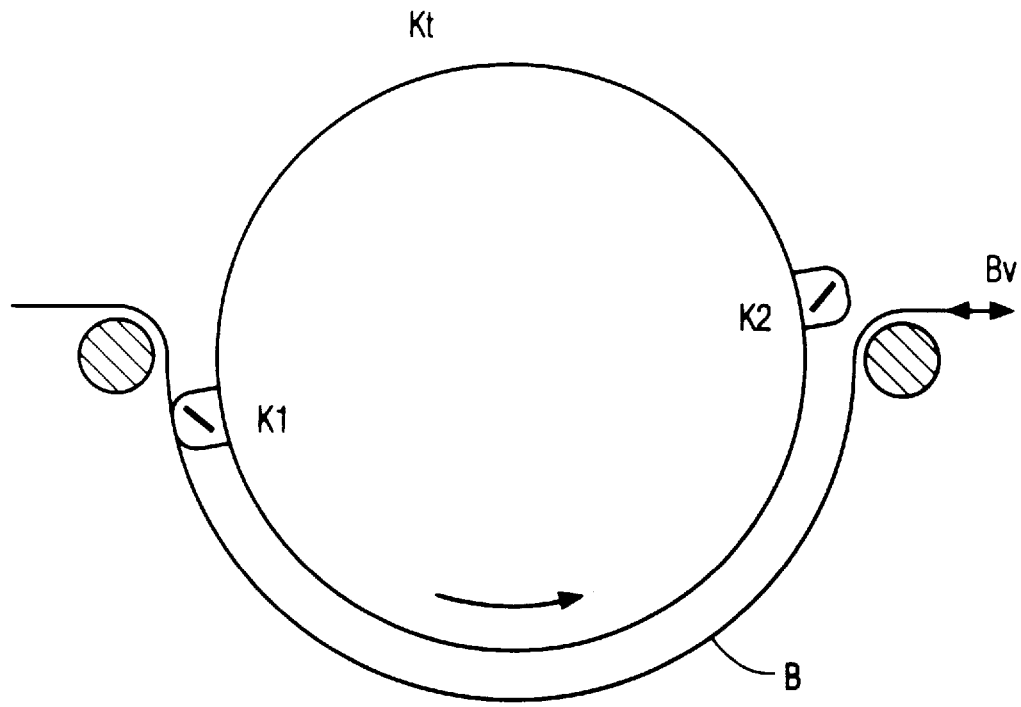
FIG. 3 shows a head drum.

A further solution is the joining of inversely written segments with variable phase offset, which is produced automatically when no measures are taken to synchronize phases. This operating mode only allows information to be read out partially but this is quite sufficient for a short program overview. FIG. 3 shows the head drum Kt with two heads K1, K2 which are offset by 180° and which have different azimuth angles. Tape B wraps around the head drum and is moved in both specified directions of tape travel Bv.

Figure 4:
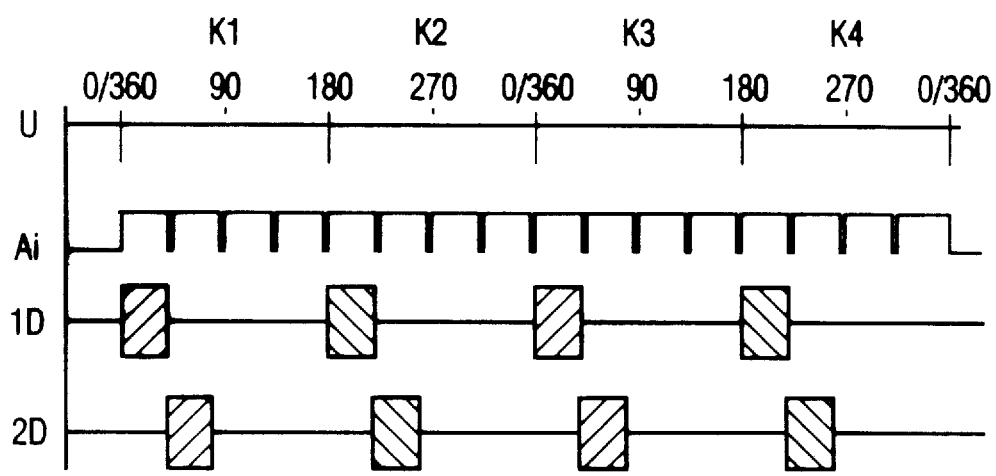
FIG. 4 shows signal variations.

FIG. 4 shows the signals dependent on the angle of rotation U (head K1 branches into the tape at 0°) and relevant to the segmenting. The gating signal for the segment recording is obtained from a signal generator which is phase-locked to the head drum. All gating intervals Ai for the recording amplifier, which were derived from the head drum servo, are shown. For each recording, only a restricted number of these are selected by a logic. The signals recorded on the tape are shown for the first pass 1D and second pass 2D. The shadings again correspond to the representations in FIG. 2.

The tracking information is contained in the data so that, after a segment has been recorded, it is used as reference for the tracking when recording the next segment with the same track angle.

The reversal of direction of travel of the tape transport Bv is uncritical due to the 2s data storage present in the system and can be carried out, for example, by an interaction between the tape drive motor and loading motor while avoiding tape loops. Such switch-over processes are known in commercially available helical track recorders (VHS, 8 mm) as play on transition to review. They are used in program search.

The occupancy of the data memory found in the system is controlled during the recording in such a manner that the memory content is minimum before a change in direction. The high occupancy after the change in direction is removed by a redundancy area which can be implemented with different segment lengths or constant segment lengths with interleaved dummy data. Both are possible. The magnitude of the redundancy is negligible since it depends on the smallest cassette having the longest playing time which can be assumed to be 1 hour. At an input data rate of 6 Mb/s, that is to say a stored data volume of 12 Mbits, a redundancy of 0.05 per cent is necessary.

An exemplary application of the present invention will now be discussed:

Generally, in helical track magnetic tape recording devices for digital data, the input data rate is lower than the recording data rate or data streams are present in intermittent form. This is the case for recorders for MPEG data streams, data recording applications, such as computer streamers on DAT, 8 mm and DVC recorders.

During replaying, first the memory is filled up and then the reading process begins. This ensures that a continuous data stream can be delivered when a change in direction occurs.

A further application of the present invention is the advantageous construction of a DVC device with extended playing time which are characterized by an intermittent "stop and go" operation with a special device in the drive mechanism for reducing noise and wear by using the tape feed motor for the reel drive.

An inexpensive solution for a large number of copying operations without placing too much load on the drive, is advantageous. The noise level is low and the track angle, the bit length etc. conform to the specifications of the DVC standard.

The magnetic tape recorder operates at the full recording data rate (25 Mb/s) and records the data on helical tracks, the information of which has first been collected in a memory. When the memory is almost empty, the recording process is interrupted, the drive is switched to replay mode and, using the inversely operated tape transport motor, is positioned to the recording previously made. When the memory content approaches its maximum value, the tape feed is started, tracking is actuated and, at the end of the previously recorded track, the drive is switched to the write state and a series of new tracks is written until the memory is almost empty again. The data can be optionally outputted later at a high data rate with continuous tape feed (fast mode) or in intermittent mode as during the recording. Two possibilities exist:

Firstly: the request for tape travel comes from the memory control and is thus determined by the fetching branch, for example the MPEG decoder.

Secondly: on the tape, timing marks were also recorded, the evaluation of which controls the drive operations as during the recording.

The total recording consists of a series of individual short recordings one after the other. Between the individual recordings, drive operations are carried out which are only driven by the tape drive motor. The different torques are generated by clutches and brakes, which are friction-locked to the tape drive.

The short recordings are in each case carried out at a maximum data rate. The maximum recording data rate is higher than the input data rate. The replay data rate corresponds to the input data rate during the recording. The replay data rate is higher than the input data rate during the recording (up to the maximum recording data rate).

The adaptation between input data rate and recording data rate is handled by a data memory which buffers the drive response times. The memory occupancy controls the recording and tape transport cycle during recording and replay. Timing reference marks also recorded during the recording control the tape transport cycle during replay. The tape drive motor drives the reel turntables.

Illustrative embodiments of the further development will now be discussed. The input data rate is a constant 2 Mb/s, with a recording data rate of 25 Mb/s. With a memory of 64 Mbit capacity and a spare capacity needed for the 10/90 per cent occupancy detection, a memory volume of 51.2 Mbits is available which allows a recording of about two seconds. With a total recording period of 4 hours and 30 minutes on one cassette, this means that the tape transport has to stop and start about 8,000 times. The idling time of the drive (memory loading operation) is 25 seconds, from which about 1 second has to be subtracted for preparing the new recording. Corresponding adaptations to other data rates or memory sizes are easily possible analogous to the numerical values given.

The above statements show that the operating mode and the direction of travel must be frequently changed for each cassette in order to be able to make use of the long recording time. For reasons of cost, direct-driven reel drive systems, which inherently switch over with little noise, cannot be used for consumer equipment. Using aspects of the present invention, the same functionality is achieved with much less drive complexity. A low-noise drive switch-over process is described in the following sections. In this arrangement, the mechanism uses the tape drive motor for repositioning the tape.

The combining of segments is done as follows:

The drive is initially in record mode, i.e., helical tracks are written with the aid of a rotating head drum having at least two heads, the track width being the result of the speed of tape advance. In this operating mode, the data memory first filled, for example, with 2 Mb/s is read out at 25 Mb/s. When the occupancy of the memory reaches the lower threshold value (e.g. 10%), the recording amplifier is switched off and the tape transport is stopped. During the phase of filling the memory which now starts, the tape transport moves back a small distance and stops again. When the occupancy of the memory reaches the upper threshold, e.g., 90 per cent, the transport moves in replay mode to the end of the area previously recorded and when the track last written is reached, switches over to record. A large number of new tracks are combined until the memory again reaches the lower occupancy value. The write and read pointers of the memory are decoupled from one another. A so-called dual-port memory can be used or a FIFO memory is possible. However, in this case, the two pointers should not "pass" each other.

Figure 5:
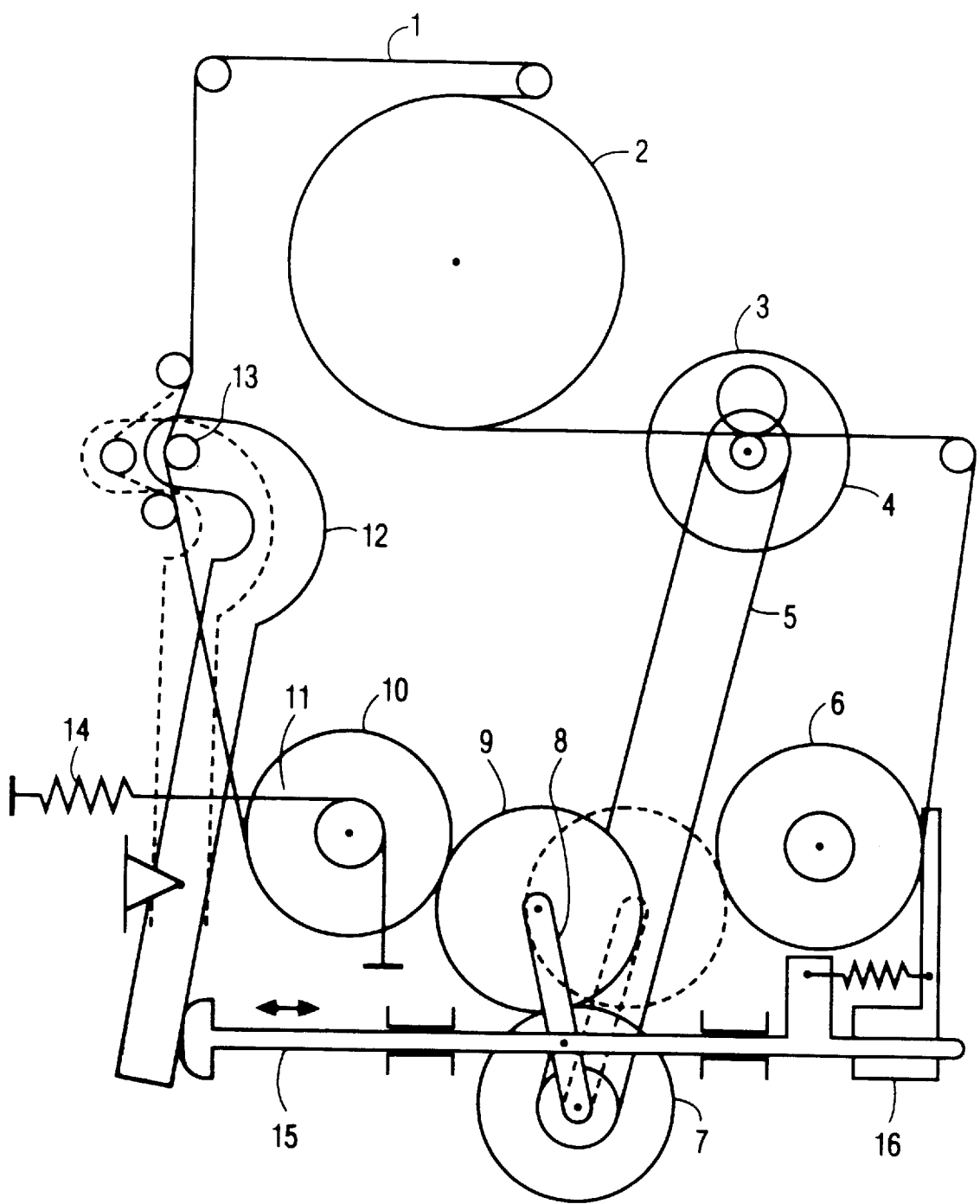
FIGS. 5–7 show constructional designs for the tape operation.
Figure 6:
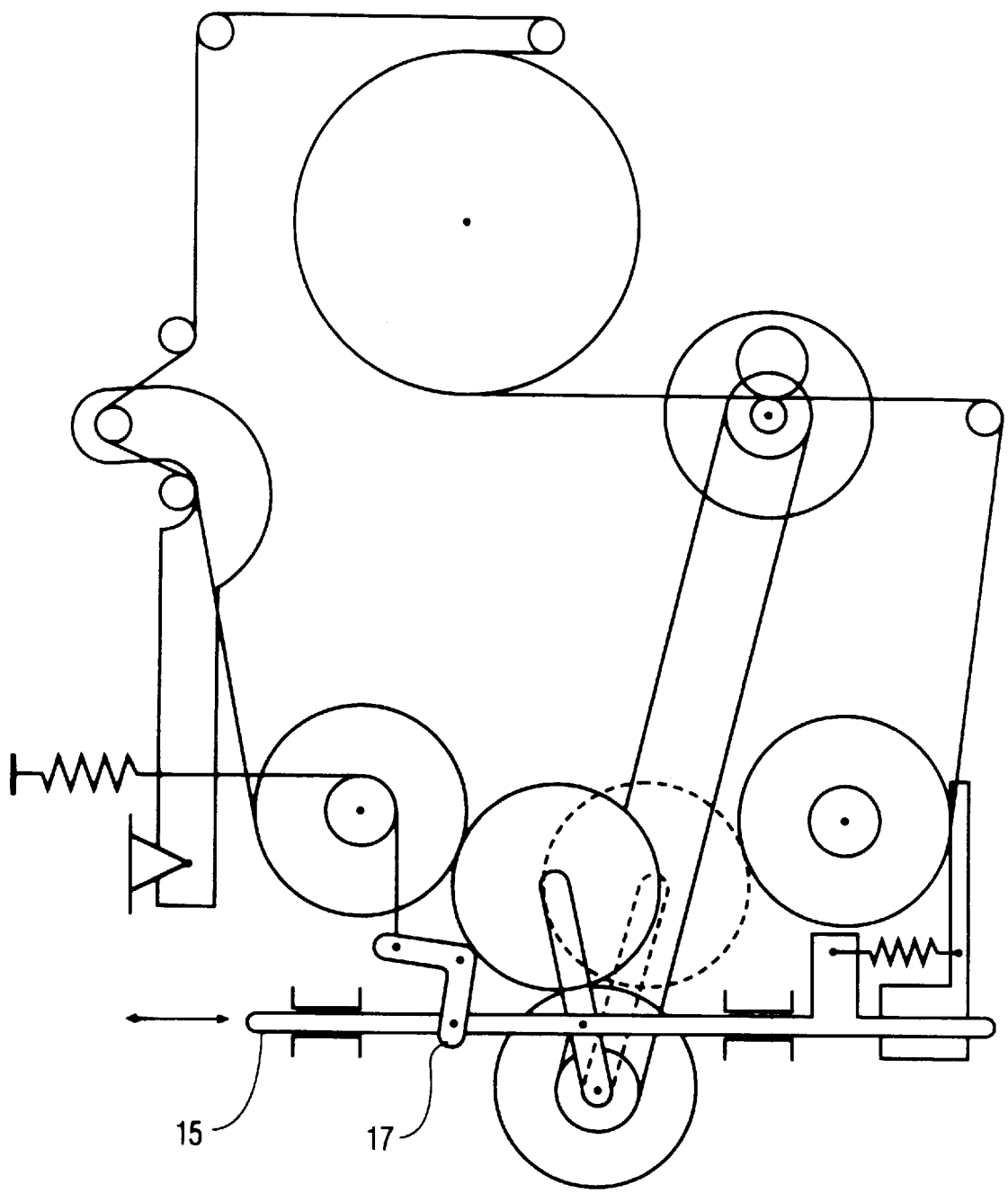

FIGS. 5 and 6 show the drive mechanism. The magnetic tape 1, wrapped around the head drum 2, is transported frictionally locked by the tape drive motor 4 and the pressure roller 3. The reel turntable friction clutches on the right 6 and left 10 are indirectly driven via belts 7, 8, 9. Depending on the direction of rotation of the tape drive, the idler swivels to the right in standard replay mode or to the left in review mode (inverse direction of travel at low speed). The tape tension of the reel 30 turntables in each case receiving the tape is generated via friction clutches in the reel turntables. The retaining tape tension is generated, in standard replay, by a tape tension control consisting of brake band 11, brake lever 12, 13 and brake spring 14. The brake band can be clamped tight unilaterally (FIG. 5) or hooked onto a moving brake band lever 17 (FIG. 6).

In review mode, the retaining tape tension is generated by a felt brake 16. Depending on the direction of tape travel the tape tension control 11 . . . 14 or, respectively, the felt brake 16 are alternately activated or deactivated, respectively. Usually, a slider 15 or a corresponding element, is used for this.

The fact that the change in operating mode between normal replay and review and the movement of the slider 15 is effected by the tape transport motor, is associated with the fact that a torque is made available in the central clutch 7 so that this torque can be picked up at the idler lever 8 or by an additional lever, not shown, by the slider 15.

Due to this type of brake operation, which has particularly low noise and is especially resistant to continuous running (indirect brake operation), it is not necessary to activate a further motor and a cam disk during normal replay and review switching.

Figure 7:
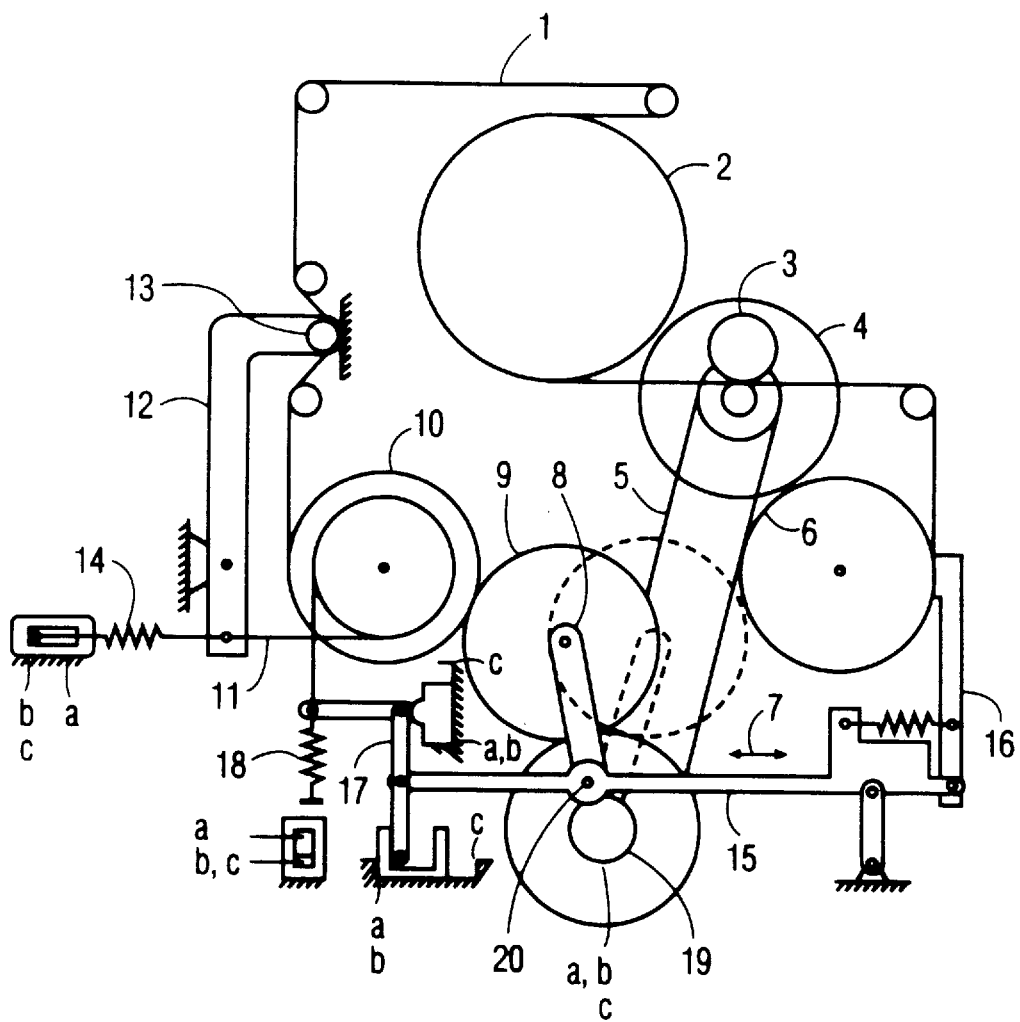

FIG. 7 shows a modification of the drives of FIGS. 5 and 6 which, apart from the main brakes for rapid rewinding, specifies all other drive functions by way of example.

A friction clutch 19 is also shown, which provides a torque which can be picked up by slider 15 at pin 20.

In the embodiment of FIG. 7, a tension spring 18 has been added. It and the brake band 11 act on the brake lever 17. Both forces cancel and thus relieve the slider 15. The friction clutch 19 can be dimensioned to be correspondingly weak which, in turn, relieves the tape drive motor 4 in the play-review operating mode.

To make the horizontal switching movement of the slider 15 as easy-running as possible, knuckle joint bearings on pendulum supports are provided throughout.

The switching of the drive function, which is not effected by the tape drive motor 4, is forced. For this purpose, some bearing points must be movably arranged. The bearings can be moved in positions a, b or c, with each case corresponding to one drive mode, i.e.;

a=tape loading, i.e. threading magnetic tape into the drive or out of it, b=play-review, (these are all modes with drive roller 3 attracted) and c=wind-rewind, where the tape drive by the reel friction clutch 6, is bypassed in this operating mode.

An exemplary application of the above embodiments will now be discussed.

Generally, in helical track magnetic tape recorders for digital data, in which the input data rate is lower than the recording data rate, the data must be constant on average but can fluctuate distinctly within short time intervals (depending on the memory size) This is the case for recorders for MPEG data streams, data recording applications, such as computer streamers on DAT, 8 mm and DVC recorders.

Further according to aspects of the present invention, the tape tension sensor and the felt brake are alternately engaged and disengaged during an assemble edit of an indirect-drive Mechadeck (with capstan-driven tape reels). In addition, the idler must swivel between the reel turntables. In the past, these functions were produced by a fast-rotating mode motor but they are now controlled by the quiet-running capstan motor. The play/review switching is carried out forcefully but in a current-saving manner by the capstan motor without the latter being continuously exposed to a high additional load. Further according to aspects of the invention, a slider is moved via a spring arm by a pin on the idler wheel, which alternately engages and disengages the tape tension sensors and the felt brake. The slider is connected to a rack which moves the slider into the final position via a friction clutch. When the direction of rotation is reversed, the friction clutch slowly moves the slider with the rack into the opposite direction, at least until the slider can be taken over again by the pin on the idler wheel. From here, the direct pin/spring arm coupling again engages for approximately 80 percent of the return stroke.

Figure 8:
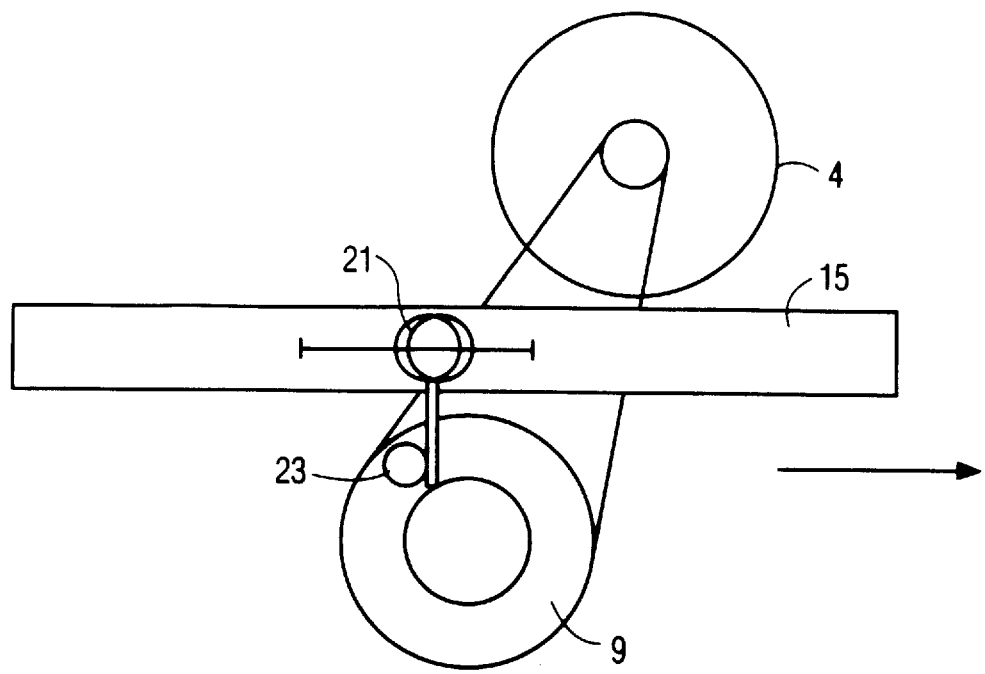
FIGS. 8–11 show various aspects of the present invention.
Figure 9:
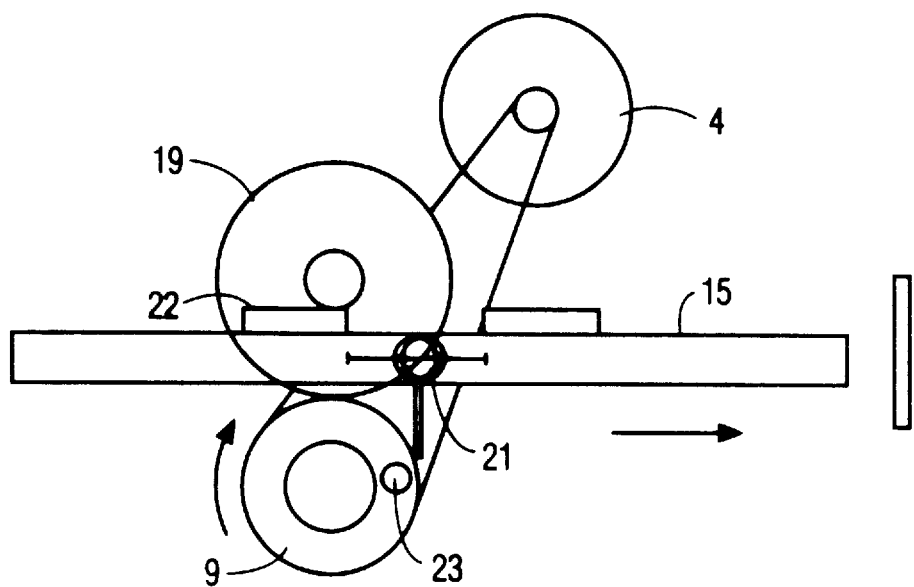

In the following discussion, the invention will be explained with reference to the illustrative embodiments of FIGS. 8 and 9. FIG. 8 shows, inter alia, that slider 15 is movable. Slider 15 is intended to engage and disengage the tape tension sensor (13) or, alternately, the felt brake (16) (not shown). The movement of slider 15 starts directly via the idler wheel 9 driven by the capstan 4. The pin 23 on the idler wheel 9 drives slider 15 via spring arm 21. After about 80 percent of the slider movement, pin 23 disengages. FIG. 9 again shows, inter alia, the slider 15 connected to a rack 22. Rack 22 and slider 15 are taken over by a step-down transmission with friction clutch 19 and slowly moved into the end position.

Friction clutch 19 holds slider 15 in its end positions. When the direction of rotation is reversed, the friction clutch 19 slowly moves the slider 15 in the opposite direction, at least until the slider can be taken over again by the pin 23 on the idler wheel 9. From here, the direct pin/spring arm coupling again engages for approximately 80 per cent of the return stroke. The process then can be repeated.

It is advantageous that the continuous basic load on the capstan 4 is low at play and review modes and corresponds to the stepdown clutch torque. It is also advantageous that the main stroke of the slider movement is forceful and direct and that the spring arm reliably brings the rack on the slider into engagement with the mode clutch by means of overtravel. The mode motor remains in the idling position during the switching over from the play mode to the review mode.

Concerning this embodiment, generally, in helical track magnetic tape recording devices for digital data, the input data rate is lower than the recording data rate or data streams are present in intermittent form. This is the case for recorders for MPEG data streams, data recording applications, such as computer streamers on DAT, 8 mm and DVC recorders.

Further according to aspects of the invention, a method is described which also leads to an extension of the playing time of the tape. In addition, the method is distinguished by its simplicity in the construction.

The method presupposes a tape drive with a wide range of speeds: SP (Standard Play), 1/3 SP, 1/5 SP, 1/7SP, in accordance with the data rate of SD (Standard Definition) to be recorded, 1/3 SD, 1/5 SD, 1/7 SD, The head drum rotates unchanged at 9,000 rpm (conforming to DVC). In the standard configuration, it is equipped with two single heads with different azimuths positioned at 180°. The recorded tracks should have a width of 10 $\mu$m in each case (conforming to DVC).

After each recorded track, the head drum remains inactive for 1 full rotation or for 2, 3, 4, 5 . . . rotations depending on the input data rate and in accordance with the selected tape speed.

| Data rate to be recorded | SD | 1/3SD | 1/5SD | 1/7SD . . . |
|---|---|---|---|---|
| Tape speed | SP | 1/3SP | 1/5SP | 1/7SP . . . |
| Inactive head drum rotatio | 0 | 1 | 2 | 3 . . . |

It is advantageous in this arrangement that, apart from the standard DVC data rate of 25 Mb/s, lower data rates of 1/3 SD, 15 1/5 SD, 1/7 SD . . . can be recorded with a corresponding extension of playing time of the tape. The track width is unchanged at 10 $\mu$m. Error correction and the ATF tracking system do not need to be modified During replay, a high redundancy can be achieved in the data by multiple reading-out of the tracks. During recording, it is possible to read during the inactive head drum rotations (detecting dropouts, marking or recording again in the margin areas). The necessary slow tape drive can be easily achieved via a belt-driven or toothed-wheel-driven (Scoopman) Indirect Drive Capstan system.

In the digital tape recording according to the helical track method of data rates which are reduced to 1/3, 1/5, 1/7 compared with the maximum recordable data rate, the tape speed is reduced in accordance with the reduced data rate to 1/3, 1/5, 1/7 of the normal speed for the recording of the maximum recordable data rate so that the playing time of the tape correspondingly increases by the factor of 3, 5, 7. The read/write heads of the head drum are switched inactive or to replay for one or more full head drum rotations after each recorded track when data is being essentially recorded. The read/write heads of the head drum are switched off for one or more full head drum rotations, or operated further for utilizing redundant data, after each track read when data is being essentially read. Due to the chaining of reduced tape speed to 1/3, 1/5, 1/7 and head drum rotations of 1, 2, 3 which are inactive during recording, constant track widths of the same width as with the maximum recordable data rate are obtained without reducing the tape speed and without inactive head drum rotations. The data to be recorded is collected in a data memory before the respective track is recorded and the data are written and read at the highest recordable data rate.

Figures 10, 11:
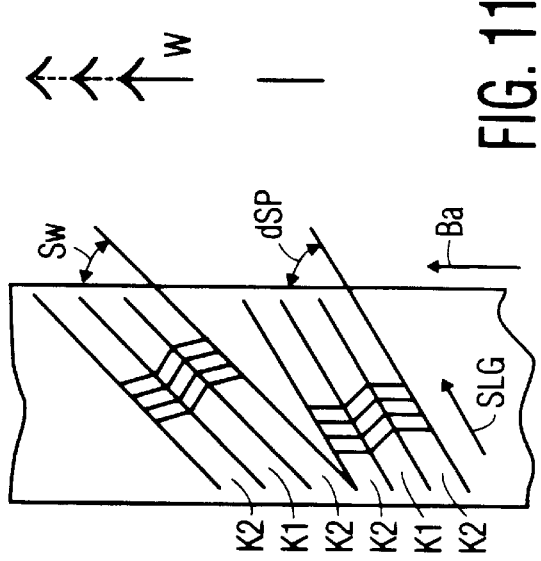

In the text which follows, the present invention will be explained with reference to the illustrative embodiments in FIGS. 10 and 11. FIG. 10 shows the signals during head switching. The tape speed Ba, the data rate Da and the engagements of the heads K1, K2 at different factors FB/FD of the tape speed (FB) and the data rate (FD) are shown.

In standard play SP, the factors for tape speed and data rate are FB/FD=1. The heads remain active with each rotation. If the tape speed drops by the factor FB=3 and the data rate drops by the factor FD=3, the heads are interactive during one rotation AU. If the tape speed drops by the factor FB=5 and the data rate drops by the factor FD=5, the heads are interactive during two rotations AU. If the tape speed drops by the factor FB=7 and the data rate drops by the factor FD=7, the heads are interactive during three rotations AU.

FIG. 11 shows the track pattern of the heads K1, K2. The read/write head speed SLG, the tape speed Ba, the dynamic track angle dSP, the change in angle due to standard play factors W and the still-frame track angle Sw are shown.

We claim:

1. A method for recording a digital data signal on a magnetic tape in helical scan mode, comprising the steps of:
   recording and reading the tape in both directions, the recording of said data signal comprising individual recording segments in a row in the helical scan direction,
   said segments of said row being recorded and read in both tape directions and differing in their track angle with respect to the direction of the recording,
   the recording data rate being constant and slightly higher than the average input data rate of said digital data rate,
   the number of segments recorded in said row during a recording process being chosen according to said input data rate,
   the recording being carried out at said constant recording data rate, and the adaptation between input data rate and recording data rate is made by determining the number of segments recorded in a row and further handled by a data memory,
   said data memory buffering the drive response during a tape direction change,
   memory occupancy controlling the recording and tape transport cycle during recording and replay,
   the direction of recording being changed after a certain number of segments or at the end or the top of the tape, and not recorded remaining segments on the tape being written in a next writing process, during a switch-over process occurring at a direction change of the tape travel, the data being temporarily stored in said memory to provide a continuous data stream, in recording mode, said memory filled during a switch-over process is nearly emptied afterwards during the recording until the next switch-over of the tape direction occurs, and in replay mode the memory is kept full enough for a switch-over process with the data being provided from the memory during said switch-over process, and filled up again afterwards, and the replay data rate corresponding to the input data rate of the recording.

2. The method according to claim 1, wherein for a direction change after recording of said certain amount of segments, drive operations are carried out which are only driven by the tape drive motor and the various torques are generated by clutches and brakes which are friction-locked to the tape drive.

3. The method according to claim 1 wherein tracking information is obtained from one segment and is contained in the recorded data.

4. The method according to claim 1 wherein the recording data rate is higher than the average input data rate of said digital data rate.

* * * * *